United States Patent
Zeolla

(10) Patent No.: US 8,701,434 B2
(45) Date of Patent: Apr. 22, 2014

(54) COOLING DEVICE WITH A FILTER UNIT

(75) Inventor: Giuseppe Zeolla, Muralto/TI (CH)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 1293 days.

(21) Appl. No.: 12/083,304

(22) PCT Filed: Jul. 25, 2006

(86) PCT No.: PCT/EP2006/007296
§ 371 (c)(1),
(2), (4) Date: Apr. 9, 2008

(87) PCT Pub. No.: WO2007/073780
PCT Pub. Date: Jul. 5, 2007

(65) Prior Publication Data
US 2009/0249813 A1    Oct. 8, 2009

(30) Foreign Application Priority Data
Nov. 17, 2005 (DE) .......................... 10 2005 054 755

(51) Int. Cl.
*F25D 17/04*    (2006.01)
(52) U.S. Cl.
USPC .................. 62/317; 62/468; 62/471; 62/474; 62/509
(58) Field of Classification Search
USPC ............ 62/317, 468, 471, 474, 509; 165/119, 165/176
See application file for complete search history.

(56) References Cited

U.S. PATENT DOCUMENTS

| 975,612 | A * | 11/1910 | Galbraith ...................... 165/117 |
| 5,628,206 | A | 5/1997 | Baba |
| 5,901,573 | A | 5/1999 | Kobayashi |
| 6,622,517 | B1 * | 9/2003 | Whitlow et al. ............... 62/474 |
| 6,694,773 | B1 | 2/2004 | Snow et al. |
| 2005/0016206 | A1 * | 1/2005 | Bellott et al. ................... 62/509 |

FOREIGN PATENT DOCUMENTS

| DE | 100 10 534 A1 | 9/2000 |
| DE | 100 09 864 A1 | 9/2001 |
| DE | 103 38 527 A1 | 3/2004 |
| EP | 0 928 709 A1 | 7/1999 |
| EP | 1 386 653 A1 | 2/2004 |
| WO | WO 00/25071 | 5/2000 |
| WO | WO 2005/010376 A1 | 2/2005 |

\* cited by examiner

*Primary Examiner* — Cassey D Bauer
(74) *Attorney, Agent, or Firm* — Roylance, Abrams, Berdo & Goodman LLP

(57) ABSTRACT

A cooling device includes a cooling unit (10) penetrated by a fluid to be cooled, in particular hydraulic oil, and a filter unit (12) for filtering the fluid. The filter unit (12) extends along a longitudinal side of the cooling unit (10). A fluid collecting space (16) is arranged between the filter unit (12) and the cooling unit (10). The fluid collecting space (16) has a uniform flow cross-section and is at least partially closed against the filter unit (12) by a concavely curved limitating wall (36). The optimized fluid guidance obtained results in a uniformization of speed, while at the same time avoiding cavities and turbulences to ensure a trouble-free and energetically favorable operation of the cooling device.

8 Claims, 2 Drawing Sheets

COOLING DEVICE WITH A FILTER UNIT

FIELD OF THE INVENTION

The present invention relates to a cooling device with a cooling unit through which a fluid to be cooled, in particular hydraulic oil, can flow, and with a filter unit for filtration of the fluid. The filter unit extends on one longitudinal side of the cooling unit. A fluid collecting chamber is located between the filter unit and the cooling unit.

BACKGROUND OF THE INVENTION

These cooling devices, as disclosed in U.S. Pat. No. 4,295,964 and in CH 533 246 A, can be used for a host of applications and are available in the most varied embodiments. The cooling device systems which have been readily available on the market to date, however, all predominantly have a filter unit flanged to the cooling unit, or have tank units connected to the cooling units with the tank unit then holding the filter element. The known cooling devices are therefore generally composed of several components. The independent cooling unit can be connected by corresponding piping to the independent filter unit as the cooling device is being produced. As a result of the piping, in the transport of the fluid, flow-induced losses occur. These losses do not favor energy-efficient operation of the known cooling device. Nor can it be precluded that leaks may occur in the area of the piping. This leaking adversely affects operating reliability.

DE 196 35 777 A discloses a cooling device with a cooling unit through which a fluid to be cooled can flow and with a filter unit for filtration of the fluid. The cooling unit and the filter unit are integrally connected to one another. The filter unit together with the cooling unit are located in a device housing. This document also discloses using a plate-shaped finned radiator as the cooling unit. The filter element is held in a filter housing in this known solution such that it is an integral component of the device housing.

U.S. Pat. No. 5,159,821 discloses a cooling device with a filter disk with a small structure in the axial direction as the filter element. The filter element is located in the device housing, and holds a plate-shaped finned radiator as the cooling unit. A drying medium extends in the fluid direction in front of the filter element within the device housing. The filter element disk connected upstream of the finned radiator on one of its longitudinal sides occupies only a small overall length there. In these known solutions as well, flow losses occur in the operation of the filter device leading to low filter efficiency. To some extent, a used filter element can be replaced by a new element only with great difficultly.

EP 1 261 809 B1 discloses a generic cooling device with a cooling unit through which a fluid to be cooled, especially hydraulic oil, can flow, and with a filter unit for filtration of the fluid. The cooling unit and the filter unit are integrally connected to one another and are located in a device housing. The cooling unit is a plate-shaped finned radiator assuming the incipient cooling tasks. The filter unit is located in the flow direction of the fluid to be cooled upstream from the plate-shaped finned radiator. This arrangement has the advantage that potential fouling, when filtered out of the fluid flow, cannot adversely affect reliable operation of the cooling unit. In the known solution the filter unit extends essentially along one longitudinal side of the finned radiator. Between the filter unit and the cooling unit, a fluid collecting chamber is connected. This fluid collecting chamber has different cross sectional areas, in particular, the cross section widens in the direction of the bottom side of the cooling device so that unfavorable flow conditions can occur with cavity formation. This collecting chamber configuration is disadvantageous for undisrupted, energy-saving operation of the known cooling device. At very low flow velocities of the fluid, the distribution of the fluid out of the fluid collecting chamber to the cooling unit leads to nonuniform distribution situations. This distribution adversely affects effective cooling of the fluid. In addition, the known solution is expensive and complex to produce.

SUMMARY OF THE INVENTION

An object of the present invention is to provide improved cooling devices enabling altogether improved operation, especially at low flow velocities.

This object is basically achieved by a cooling device where a fluid collecting chamber has a uniform flow cross section and is sealed relative to the filter unit at least partially by a concavely curved boundary wall. Optimized fluid routing is achieved leading to the velocity behavior becoming uniform while avoiding cavities and turbulence. Trouble-free, energy-efficient operation is then possible with the cooling device according to the present invention.

In particular, the free fluid cross section in the fluid collecting chamber can be adapted to the free flow cross sections in the area of the filter unit. Preferably, the fluid collecting chamber is made semicircular in cross section. The filter unit has a filter element held in a filter housing with a cylindrical installation space. Thus, the free flow cross sections can continue and remain within the filter housing in the fluid collecting chamber so that in spite of deflected flows in the area of the transition between the filter housing and the fluid collecting chamber, for the most part problem-free fluid transport is achieved.

In one especially preferred embodiment of the cooling device according to the present invention, the fluid collecting chamber in the middle has another boundary wall dividing the fluid collecting chamber into two component spaces. One component space has a fluid connection to the filter housing. The other component space has an outlet for discharge of filtered and cooled fluid. As a result of the other boundary wall in the fluid collecting chamber, the fluid flow can be divided. One component flow comes from the filter unit first being supplied to the part of the cooling unit, which flow, in the reverse direction and cooled by the other part of the cooling unit, re-enters the component space of the fluid collecting chamber bordered by the other boundary wall, in order from there to leave the cooling device filtered and cooled. This arrangement is especially favorable for fluid flows to be routed with a low speed. By division and due to separation via the respective boundary wall the cooling and transport performances can be "proportioned". This operation cannot be achieved with the known, described solutions.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
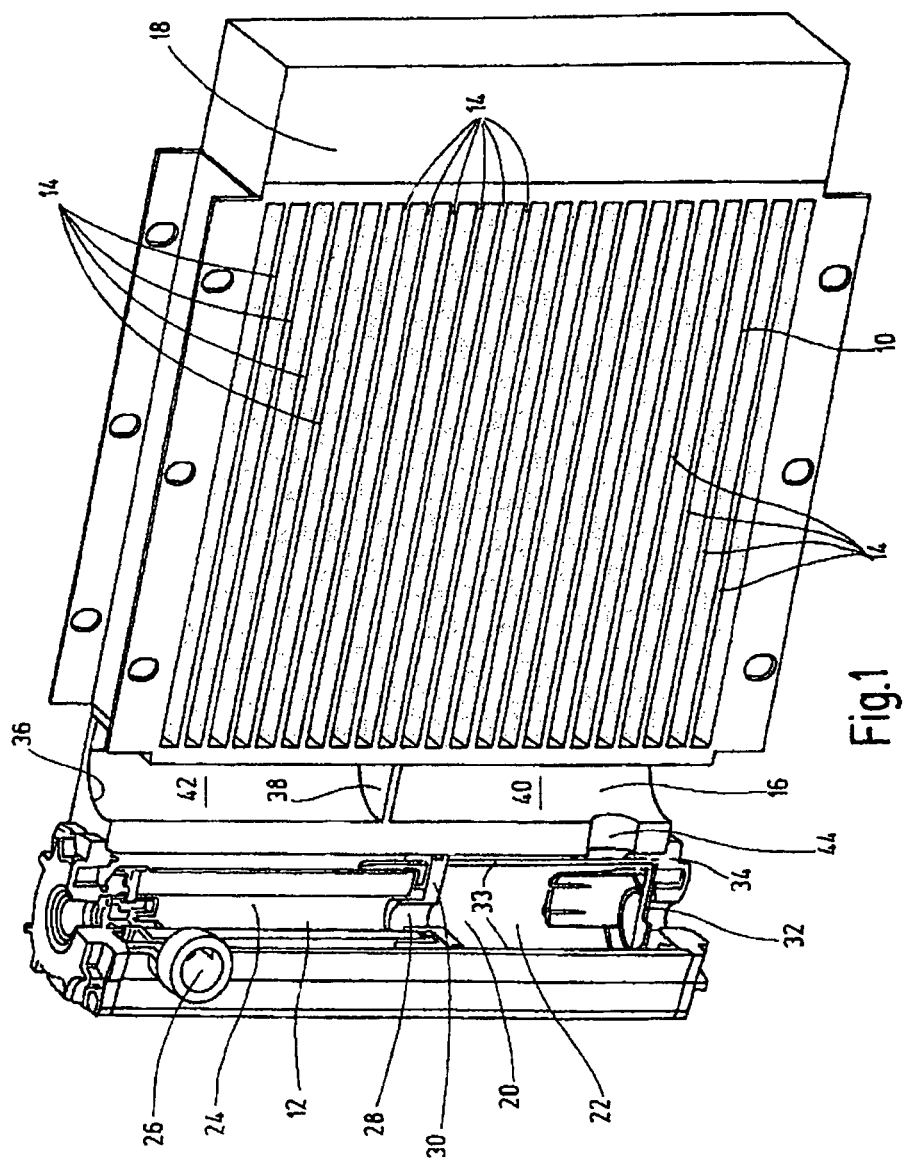
FIG. 1 is a top perspective view, partially in section, of a cooling device according to one exemplary embodiment of the present invention.

The cooling device shown in the figures has a cooling unit 10 through which a fluid to be cooled, in particular, hydraulic oil, can flow, and a filter unit 12 for filtration of this fluid. The cooling unit 10 is made as a plate-shaped finned radiator, i.e., to guide the cooling air, the plate radiator has fins (not shown) folded up in a zig-zag shape and defining and bordering between the fluid routing channels 14 to transport the fluid to be cooled. The direction of air routing through the cooling unit 10 extends perpendicular to the plane of FIG. 1. The fluid transport direction extends transversely to the direction of air routing, that is, within the plane of the figure. The stacked fluid routing channels 14 discharge on either side into the fluid collecting chambers 16, 18. The structure of these finned radiators is in general conventional, so that it will no longer be detailed here. The device housing of the cooling unit 10 can be an aluminum casting or the like. It can also be composed in the conventional manner of sheet metal parts in a box shape and can be assembled to form the overall housing via weld connections. For the sake of simplicity, the upper and the lower end wall for the collecting chamber 16 are not shown.

Viewed in the direction of FIG. 1, the filter unit 12 extends on the left longitudinal side of the cooling unit 10. Filter unit 12 has a filter housing 20 with a cylindrical installation space 22 lying in the middle for holding a cylindrical filter element 24 of conventional design in the upper half of installation space 22. This filter unit 24 is made of conventional filtration materials and comprises, for example, a pleated, hollow cylindrical, multilayer filter mat surrounding a middle support tube which is not detailed. Viewed in the direction of FIG. 1, the filter housing 20 in its upper end area has an inlet 26 for at least partially fouled and heated fluid. The fluid supplied in this way via the inlet 26 flows through the filter element 24 from the outside to the inside. The filtered fluid is discharged in the middle from the filter element 24 through the bottom outlet opening 28 of a spacer layer 30. This spacer layer 30 is supported on a clip-shaped or cage-shaped holding unit 32 with individual holding rods 33, which in turn are supported on the bottom part 34 of the filter housing 20. This bottom part 34 can seal the filter unit 12 fluid-tight to the bottom, that is, on the bottom-side, but can also be used to hold a bypass valve (not shown), for example, to supply fouled fluid cleaned by the filter unit 12 not to the cooling unit 10 for cooling purposes, but to drain it out of the device. This draining can be advantageous, for example, when the temperature of the filtered fluid does not yet necessitate cooling or does so only partially.

By the holding unit 32 and the spacer layer 30, it is possible to insert filter elements 24 of different lengths into the same cooling device to perform various filtration tasks in practical applications. Preferably, as shown in FIG. 1, the overall length of the filter element 24 is chosen such that in the axial direction only roughly half of the installation space 22 of the filter housing 20 is used by the filter elements so that underneath the filter element 24 a cylindrical holding space is formed contributing to making the fluid flow uniform in the filter housing 20 after filtration.

As FIG. 1 furthermore shows, between the filter unit 12 and the cooling unit 10 is the first fluid collecting chamber 16 with an axial extension length adapted according to connection possibilities on the longitudinal side of the finned radiator as the cooling unit 10. This fluid collecting chamber 16 has a uniform flow cross section and is closed by a concavely curved boundary wall 36 relative to the filter unit 12. These conditions are especially clearly illustrated in FIG. 2. In this way, for the fluid collecting chamber 16 a semicircular tube is formed which with its flat connection cross section engages the face of the finned radiator.

Preferably, the other or the second fluid collecting chamber 18 on the opposite longitudinal side of the finned radiator has a comparable half tube structure. The possibility also exists of selecting a different, in particular, square cross section. Fluid collecting chamber 18 continuously has connection possibilities to the fluid routing channels 14 of the cooling unit 10. In the embodiment shown in the figures, the fluid collecting chamber 16 is divided roughly in the middle by another boundary wall 38 dividing the fluid collecting chamber 16 fluid-tight into two equal length component spaces 40, 42, with component space 42 laterally adjacent filter element 24 and component space 40 laterally adjacent the cylindrical holding space underneath filter element 24.

Figure 2:
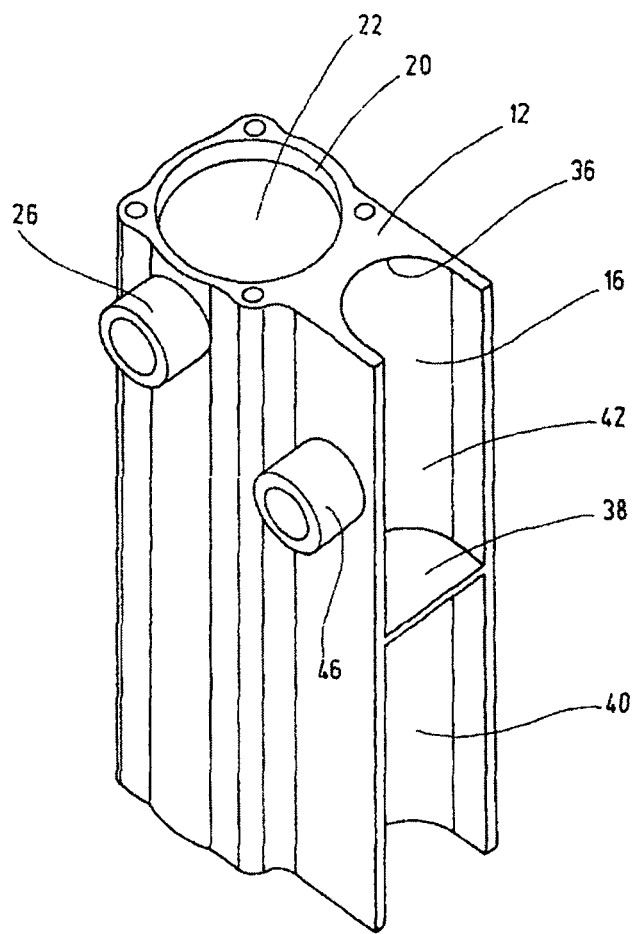
FIG. 2 is a top perspective view, partially in section, of the structure of the filter housing and fluid collecting chamber located on the left as viewed in FIG. 1, without the filter element inserted.

To supply the lower component space 40, a transverse passage 44 is used, preferably in the form of a hole connecting the component space 40 to carry fluid from the interior of the filter housing 20, in particular from the installation space 22 for the filter element 24. Fluid which has been filtered in this way is thus fed into the component space 40 by the transverse passage 44 and then flows from left to right through the fluid routing channels 14. Cooling is induced by the cooling unit 10 in its lower half area. The fluid or medium which has been cooled in this way then enters the other fluid collecting chamber 18, rises toward the top when viewed in the direction of FIG. 1, and then crosses the fluid routing channels 14 from right to left in the upper area, in particular in the upper half of the cooling unit 10. The fluid medium completely cooled in this way enters the second or upper component space 42 and from there the fluid which has been filtered and cooled leaves the fluid device via the outlet 46 which has the same axial direction as the inlet 26 (compare the partial representation as shown in FIG. 2).

This arrangement for the most part makes the fluid flow uniform both in the filter unit 12, in the cooling unit 10 and in the two fluid collecting chambers 16, 18. In particular, slowly flowing fluid can be filtered and cooled in this way without disruption. Due to the constantly maintained cross sectional characteristics energy-efficient filtering and cooling operation with the cooling device according to the present invention are possible. As FIG. 2 shows in particular, the filter unit 12 with the fluid collecting chamber 16 can be produced in one piece, for example, in the form of a diecasting, to connect the unit which has then been produced in this way fluid-tight to the remaining cooling unit 10 on its one face side by a conventional welding process. If the other boundary wall 38 is omitted, with the described cooling device according to the present invention, even more quickly flowing media can be reliably managed. Preferably in the area of the second fluid collecting chamber 18, an outlet (not shown) then has to be provided for discharging the filtered and cooled fluid. With the cooling device according to the present invention, a unit of very compact structure is formed which can be flexibly adapted to the different filtering and cooling tasks without the fundamental structure of the cooling device having to be changed. This adaptability helps to save money. Otherwise, the cooling device according to the present invention is easy to maintain and install, also helping to save money.

While one embodiment has been chosen to illustrate the invention, it will be understood by those skilled in the art that various changes and modifications can be made therein without departing from the scope of the invention as defined in the appended claims.

What is claimed is:

1. A cooling device, comprising:
a cooling unit through which a fluid to be cooled can flow;
a filter unit for filtering the fluid extending on one longitudinal side of said cooling unit, said filter unit having a filter housing with a filter element held in an installation space within said filter housing; and
a first fluid collecting chamber located between said filter unit and said cooling unit and having a uniform flow cross-section along an entire length thereof, said first fluid collecting chamber being sealed relative to said filter unit by an at least partially concavely curved first boundary wall, said first fluid collecting chamber having a second boundary wall in a middle thereof dividing said fluid collecting chamber into first and second component spaces, said first component space having a fluid connection to said filter housing, said first fluid collecting chamber being semicircular in transverse cross section and having a flat connection wall engaging a face of said cooling unit, said first component space being in fluid communication via said cooling unit with said second component space, said second component space being fluid tight relative said filter unit and having an outlet for discharging filtered and cooled fluid.

2. A cooling device according to claim 1 wherein
said filter element having a length substantially equal to a distance of said second boundary wall from an opposite end of one of said component spaces.

3. A cooling device according to claim 1 wherein
a second fluid collecting chamber is on a longitudinal side of said cooling unit opposite said filter unit.

4. A cooling device according to claim 1 wherein
said filter housing and said first fluid collecting chamber form a one-piece unit connectable to said cooling unit as another unit.

5. A cooling device according to claim 1 wherein
said filter element is supported in said filter housing on a spacer layer held by a holding unit supported on a bottom part of said filter housing.

6. A cooling device according to claim 1 wherein
said fluid is hydraulic oil.

7. A cooling device according to claim 1 wherein
said first and second component spaces are substantially equal in length.

8. A cooling device according to claim 7 wherein
said filter housing and said first collecting chamber are substantially equal in length; and
said filter element is located in said filter housing laterally adjacent said second component space only with said installation space being generally free of said filter element laterally adjacent said first component space.

* * * * *